US012750130B2

(12) United States Patent
Hong

(10) Patent No.: US 12,750,130 B2
(45) Date of Patent: Sep. 29, 2026

(54) WIRELESS COMMUNICATION METHOD, TERMINAL, BASE STATION, COMMUNICATION DEVICE, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 704 days.

(21) Appl. No.: 18/001,285

(22) PCT Filed: Jun. 12, 2020

(86) PCT No.: PCT/CN2020/095975
§ 371 (c)(1),
(2) Date: Dec. 9, 2022

(87) PCT Pub. No.: WO2021/248500
PCT Pub. Date: Dec. 16, 2021

(65) Prior Publication Data
US 2023/0254034 A1 Aug. 10, 2023

(51) Int. Cl.
*H04B 7/185* (2006.01)
*H04W 8/24* (2009.01)

(52) U.S. Cl.
CPC .......... *H04B 7/18539* (2013.01); *H04W 8/24* (2013.01)

(58) Field of Classification Search
CPC .............................. H04W 8/24; H04B 7/18539
See application file for complete search history.

(56) References Cited

U.S. PATENT DOCUMENTS

| | | | | |
|---|---|---|---|---|
| 9,788,291 | B1 | 10/2017 | Tracy et al. | |
| 9,973,984 | B1 | 5/2018 | Hall et al. | |
| 2002/0115448 | A1 * | 8/2002 | Amerga | H04B 7/2606 342/450 |
| 2013/0178163 | A1 | 7/2013 | Wang | |
| 2016/0323032 | A1 | 11/2016 | Ulupinar et al. | |

(Continued)

FOREIGN PATENT DOCUMENTS

| | | | |
|---|---|---|---|
| CN | 103199901 | A | 7/2013 |
| CN | 103427937 | A | 12/2013 |
| CN | 108702638 | A | 10/2018 |

(Continued)

OTHER PUBLICATIONS

Notice of Allowance issued Jan. 12, 2024, in corresponding Chinese Patent Application No. 202080001226.7 (with English Translation and English Translation of Category of Cited Documents), 8 pages.

(Continued)

*Primary Examiner* — Sulaiman Nooristany
(74) *Attorney, Agent, or Firm* — Oblon, McClelland, Maier & Neustadt, L.L.P.

(57) ABSTRACT

Aspects of the disclosure are related to wireless communication method that is applied to a terminal. The method can include sending communication capability information of the terminal to a base station, where the communication capability information can be used at least for indicating whether the terminal has a communication capability of communicating with a satellite.

6 Claims, 7 Drawing Sheets

(56) References Cited

U.S. PATENT DOCUMENTS

| | | | | |
|---|---|---|---|---|
| 2021/0344413 | A1* | 11/2021 | Gao | H04W 24/02 |
| 2022/0007440 | A1* | 1/2022 | Vaidya | H04W 24/10 |

FOREIGN PATENT DOCUMENTS

| | | | |
|---|---|---|---|
| CN | 108988934 | A | 12/2018 |
| CN | 109787678 | A | 5/2019 |
| CN | 110361692 | A | 10/2019 |
| CN | 111031534 | A | 4/2020 |
| CN | 111224708 | A | 6/2020 |
| JP | 2013-27006 | A | 2/2013 |
| KR | 102520428 | A | 6/2012 |
| KR | 10-2020-0066167 | A | 6/2020 |
| KR | 10-2020-0067091 | A | 6/2020 |

OTHER PUBLICATIONS

Jin Xin et al., "Research on Secure Transmission or Forward Link in Hybrid Satellite-Terrestrial Communications Networks", Journal of Astronautics, vol. 40, No. 12, 2019, pp. 1444-1452 and cover page, (with English Abstract).

Ren Huan et al., "Implementation of Radio Resource Decision Software in Satellite Communication Gateway Station", 2019, pp. 1-6 (with English Abstract).

ZTE, "Discussion on the TA and PRACH for NTN", 3GPP TSG RAN WG1 #98bis Chongqing, China, Oct. 14-20, 2019, R1-1910364, pp. 1-10.

Huawei, "Support of WUS", 3GPP TSG-RAN WG3 #107-e, E-Meeting, 2020, R3-200175, 16 pages.

Nokia, Nokia Shanghai Bell, "Continuation of the work on CHO for NG- and S1-based handover (incl. TPs for NGAP and S1AP BL CRs)", 3GPP TSG-RAN WG3 Meeting #107-bis-e, E-meeting, 2020, 87 pages.

International Search Report with English translation mailed on Jan. 27, 2021 in PCT/CN2020/095975 filed on Jun. 12, 2020 (4 pages).

* cited by examiner

WIRELESS COMMUNICATION METHOD, TERMINAL, BASE STATION, COMMUNICATION DEVICE, AND STORAGE MEDIUM

CROSS-REFERENCE TO RELATED APPLICATIONS

The present application is a U.S. National Stage of International Application No. PCT/CN 2020/095975, filed on Jun. 12, 2020, the contents of all of which are incorporated herein by reference in their entireties for all purposes.

BACKGROUND OF THE INVENTION

Field of the Invention

The present disclosure relates to the field of wireless communication technology but is not limited to the field of wireless communication technology, and in particular relates to a wireless communication method, terminal, base station, communication device, and storage medium.

Description of the Related Art

With further evolution of the standardization of the fifth-generation mobile communication technology (5G, 5th-Generation) and rapid deployment of the wireless network of the fifth-generation mobile communication technology (5G), the industry has started to conduct research for the sixth-generation mobile communication technology (6G, 6th-Generation). The integration of airspace, sky space, territory and sea area is key technology for the 6th-Generation mobile communication technology (6G).

SUMMARY OF THE INVENTION

Embodiments of the present disclosure disclose a wireless communication method, applied to a terminal and including sending communication capability information of the terminal to a base station, wherein the communication capability information is used at least for indicating whether the terminal has a communication capability of communicating with a satellite.

In an embodiment, the method further includes receiving connection information of at least one satellite sent by the base station with respect to the communication capability information, and establishing a communication connection with the satellite based on the connection information.

In an embodiment, the connection information includes at least one of: an identifier ID of the satellite; trajectory information, for indicating a trajectory of the satellite; flight speed information, for indicating a flight speed of the satellite; and signal coverage information, for indicating signal coverage of the satellite.

In an embodiment, said sending communication capability information of the terminal to a base station includes sending the communication capability information of the terminal to the base station using radio resource control RRC signaling.

In an embodiment, the RRC signaling is user equipment new radio capability signaling, UE-NR-Capability signaling, or user equipment evolved Universal Mobile Communication System Terrestrial Radio Access Capability signaling, UE-EUTRAN-Capability signaling.

According to a second aspect of embodiments of the present disclosure, there is provided a wireless communication method, applied to a base station and including receiving communication capability information sent by a terminal, wherein the communication capability information is used at least for indicating whether the terminal has a communication capability of communicating with a satellite.

In an embodiment, the method further includes sending connection information of at least one satellite to the terminal that supports communication with the satellite as determined based on the communication capability information, wherein the connection information is used for establishing a communication connection between the terminal and the satellite.

In an embodiment, the method further includes receiving the connection information of the satellite sent by a gateway station of the satellite.

In an embodiment, the connection information includes at least one of an identifier ID of the satellite; trajectory information, for indicating a trajectory of the satellite; flight speed information, for indicating a flight speed of the satellite; and signal coverage information, for indicating signal coverage of the satellite.

In an embodiment, said receiving communication capability information sent by a terminal includes receiving the communication capability information sent by the terminal using RRC signaling.

In an embodiment, the RRC signaling is user equipment new radio capability signaling, UE-NR-Capability signaling, or user equipment evolved Universal Mobile Communication System Terrestrial Radio Access capability signaling, UE-EUTRAN-Capability signaling.

According to a third aspect of embodiments of the present disclosure, there is provided a terminal, including a first sending module, wherein the first sending module is configured to send communication capability information of the terminal to a base station, wherein the communication capability information is used at least for indicating whether the terminal has a communication capability of communicating with a satellite.

In an embodiment, the terminal further includes a first receiving module and a connection module, wherein the first receiving module is configured to receive connection information of at least one satellite sent by the base station with respect to the communication capability information; the connection module is configured to establish a communication connection with the satellite based on the connection information.

In an embodiment, the first sending module is further configured to send the communication capability information of the terminal to the base station using radio resource control RRC signaling.

According to a fourth aspect of embodiments of the present disclosure, there is provided a base station, including a second receiving module, wherein the second receiving module is configured to receive communication capability information sent by a terminal, wherein the communication capability information is used at least for indicating whether the terminal has a communication capability of communicating with a satellite.

In an embodiment, the base station includes a second sending module, wherein the second sending module is configured to send connection information of at least one satellite to the terminal that supports communication with the satellite as determined based on the communication capability information, wherein the connection information is used for establishing a communication connection between the terminal and the satellite.

In an embodiment, the second receiving module is further configured to receive the connection information of the satellite sent by a gateway station of the satellite.

In an embodiment, the second receiving module is further configured to receive the communication capability information sent by the terminal using RRC signaling.

According to a fifth aspect of embodiments of the present disclosure, there is provided a communication device, including a processor and a memory for storing instructions executable by the processor. The processor being configured to implement the method according to any embodiment of the present disclosure, when running the executable instructions.

According to a sixth aspect of embodiments of the present disclosure, there is provided a computer storage medium, wherein the computer storage medium stores a computer executable program, the executable program implements the method according to any embodiment of the present disclosure when executed by a processor.

BRIEF DESCRIPTION OF THE DRAWINGS

Various exemplary embodiments of this disclosure that are proposed as examples will be described in detail with reference to the following figures, wherein like numerals reference like elements, and wherein.

DETAILED DESCRIPTION OF THE PREFERRED EMBODIMENTS

Exemplary embodiments will be described in detail herein, examples of which are illustrated in the accompanying drawings. When the following description refers to the drawings, the same numerals in different drawings refer to the same or similar elements unless otherwise indicated. The implementations described in the exemplary embodiments below are not intended to represent all implementations consistent with embodiments of the present disclosure. Rather, they are merely examples of apparatus and methods consistent with some aspects of the present disclosure, as recited in the appended claims.

The terms used in embodiments of the present disclosure are used only for the purpose of describing particular embodiments and are not intended to limit embodiments of the present disclosure. The singular forms of "a/an" and "the" as used in the embodiments of the present disclosure and the appended claims are also intended to include the plural form, unless the context clearly indicates otherwise. It should also be understood that the term "and/or" as used herein refers to and includes any or all possible combinations of one or more of the associated listed items.

It should be understood that although the terms first, second, third, etc. may be used to describe various information in embodiments of the present disclosure, such information should not be limited to these terms. These terms are used only to distinguish the same type of information from one another. For example, without departing from the scope of embodiments of the present disclosure, first information may also be referred to as second information, and similarly, second information may also be referred to as first information. Depending on the context, for example, the word "if" as used herein may be interpreted as "at . . . " or "when . . . " or "in response to determining."

For the sake of brevity and ease of understanding, the terms "greater than" or "less than" are used herein to represent size relationships. However, for those skilled in the art, it is understood that the term "greater than" also covers the meaning of "greater than or equal to", and "less than" also covers the meaning of "less than or equal to."

Figure 1:
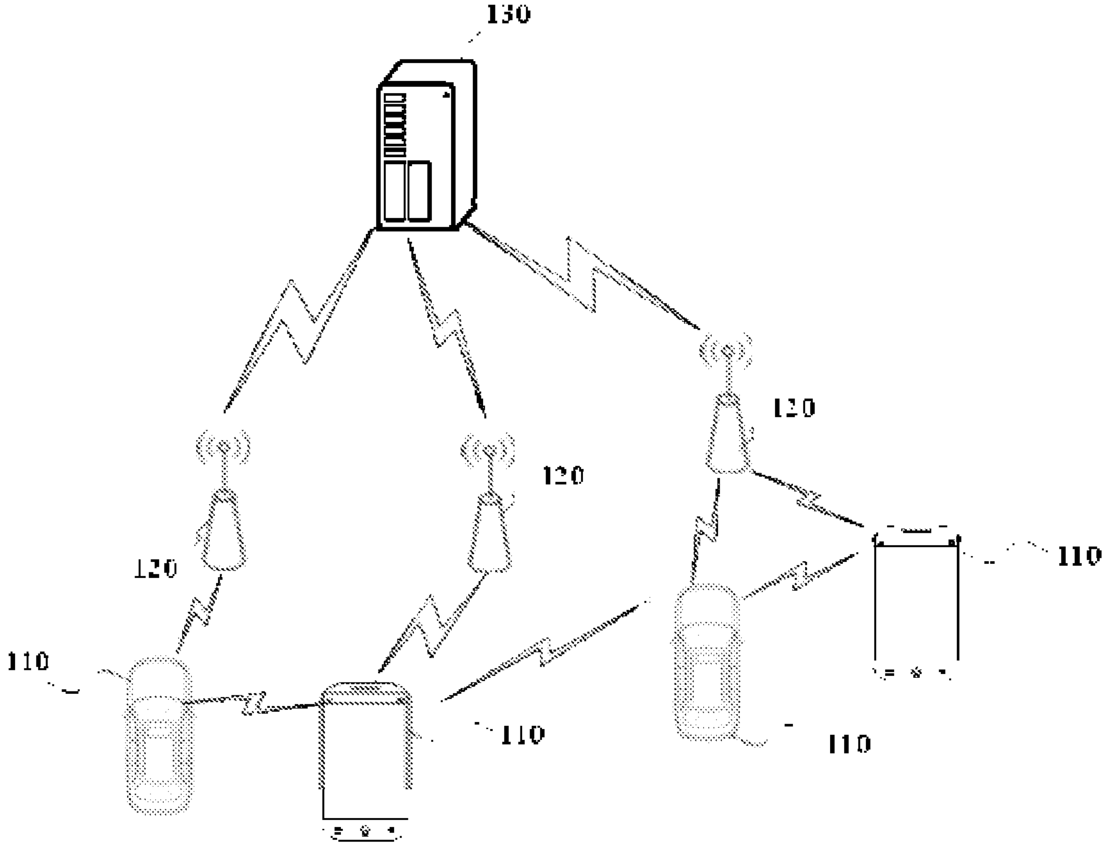
FIG. 1 is a schematic diagram of the structure of a wireless communication system.

Referring to FIG. 1, a schematic diagram of a structure of a wireless communication system provided by embodiments of the present disclosure is shown. As shown in FIG. 1, the wireless communication system is a communication system based on cellular mobile communication technology. The wireless communication system may include a plurality of user devices 110 and a plurality of base stations 120.

The user devices 110 may be devices that provide voice and/or data connectivity to a user. The user devices 110 may communicate with one or more core networks via a Radio Access Network (RAN). The user devices 110 may be IoT user devices, such as sensor devices, cell phones (or "cellular" phones), and computers with IoT user devices, for example, fixed, portable, pocket-sized, handheld, computer-built, or vehicle-mounted devices. For example, the user device may be a station (STA), subscriber unit, subscriber station, mobile station, mobile, remote station, access point, remote terminal, access terminal, user terminal, user agent, user device, or user equipment. Alternatively, the user device 110 may be a device of an unmanned aerial vehicle. Alternatively, the user device 110 may also be a vehicle-mounted device, for example, a trip computer with wireless communication functions, or a wireless user device external to the trip computer. Alternatively, the user device 110 may also be a roadside device, for example, it may be a street light, signal light, or other roadside device with wireless communication functions, etc.

The base station 120 may be a network-side device in a wireless communication system. The wireless communication system may be a fourth generation mobile communication (the 4th generation mobile communication, 4G) system, also known as a Long Term Evolution (LTE) system. Alternatively, the wireless communication system may also be a 5G system, also known as a new radio system or a 5G NR system. Alternatively, the wireless communication system may also be a next-generation system of the 5G system. The access network in the 5G system may be referred to as NG-RAN (New Generation-Radio Access Network).

The base station 120 may be an evolved base station (eNB) used in the 4G system. Alternatively, the base station 120 may also be a base station (gNB) with a centralized distributed architecture used in the 5G system. When the base station 120 adopts a centralized distributed architecture, it usually includes a central unit (CU) and at least two distributed units (DU). The central unit is equipped with a protocol stack of Packet Data Convergence Protocol (PDCP) layer, Radio Link Control (RLC) layer, and Media Access Control (MAC) layer. The distributed unit is equipped with a physical (PHY) layer protocol stack. The specific implementation of the base station 120 is not limited in embodiments of the present disclosure.

A wireless connection can be established between the base station 120 and the user device 110 through a wireless air interface. In various implementations, the wireless air interface is a wireless air interface based on the fourth generation mobile communication network technology (4G) standard. Alternatively, the wireless air interface is a wireless air interface based on a fifth generation mobile communication network technology (5G) standard. For example, the wireless air interface is a new air interface. Alternatively, the wireless air interface may also be a wireless air interface based on a more next generation mobile communication network technology standard of 5G.

In some embodiments, an E2E (End to End) connection may also be established between user devices 110. Examples include V2V (vehicle to vehicle) communication, V2I (vehicle to Infrastructure) communication, and V2P (vehicle to pedestrian) communication in V2X (vehicle to everything) communication.

Herein, the above user device may be considered as a terminal device in the following embodiments. In some embodiments, the above wireless communication system may also include a network management device 130.

A number of base stations 120 are connected to the network management device 130 respectively. The network management device 130 may be a core network device in the wireless communication system. For example, the network management device 130 may be a Mobility Management Entity (MME) in Evolved Packet Core (EPC). Alternatively, the network management device may also be another core network device, such as a Serving GateWay (SGW), Public Data Network GateWay (PGW), Policy and Charging Rules Function (PCRF), or Home Subscriber Server (HSS), etc. The implementation form of the network management device 130 is not limited in embodiments of the present disclosure.

To facilitate the understanding of any embodiment of the present disclosure, a wireless communication network is described firstly.

The satellite communication may be communication between radio communication stations on the ground using communication satellites as relay stations to relay radio waves. The communication functions of a communication satellite include one or more of the following: receiving signals, changing the frequency of signals, amplifying signals, forwarding signals, and positioning.

Figure 2:
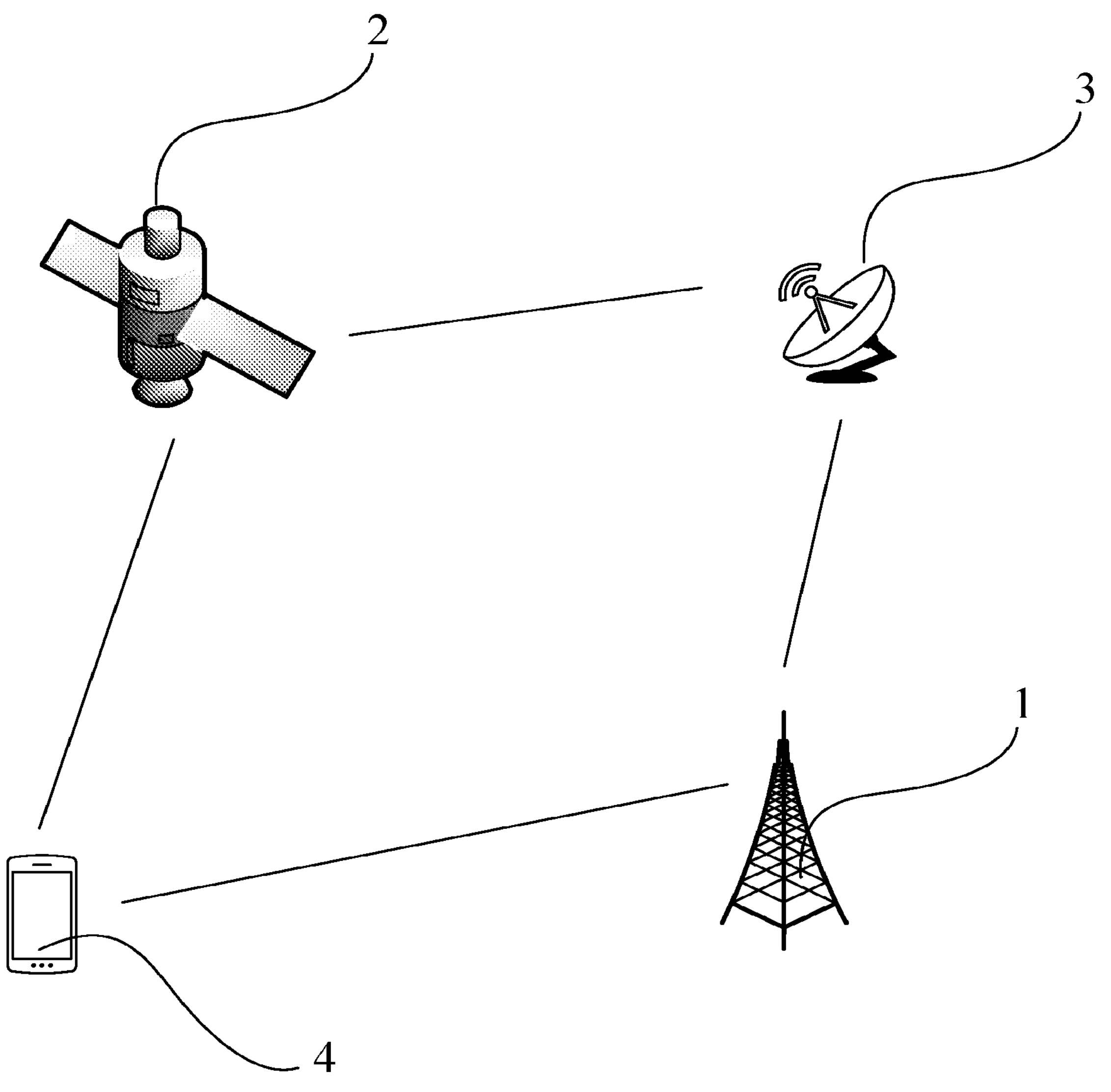
FIG. 2 is a schematic diagram of the structure of a wireless communication system illustrated according to an exemplary embodiment.

In an embodiment, in FIG. 2, the wireless communication network may be a network that incorporates a mobile communication network and a satellite communication network. The wireless communication network includes a base station 1, and the satellite communication network includes a communication satellite 2 and a gateway station 3 of the communication satellite.

In an embodiment, the base station 1 may establish a wireless communication connection with the gateway station 3. The terminal 4 may establish a wireless communication connection with the base station 1. The terminal 4 may establish a wireless communication connection with the satellite 2. Herein, terminal 4 can be a multi-mode terminal, and the multi-mode terminal is a terminal that supports both wireless communication with the satellite 2 and communication with the base station 1.

Figure 3:
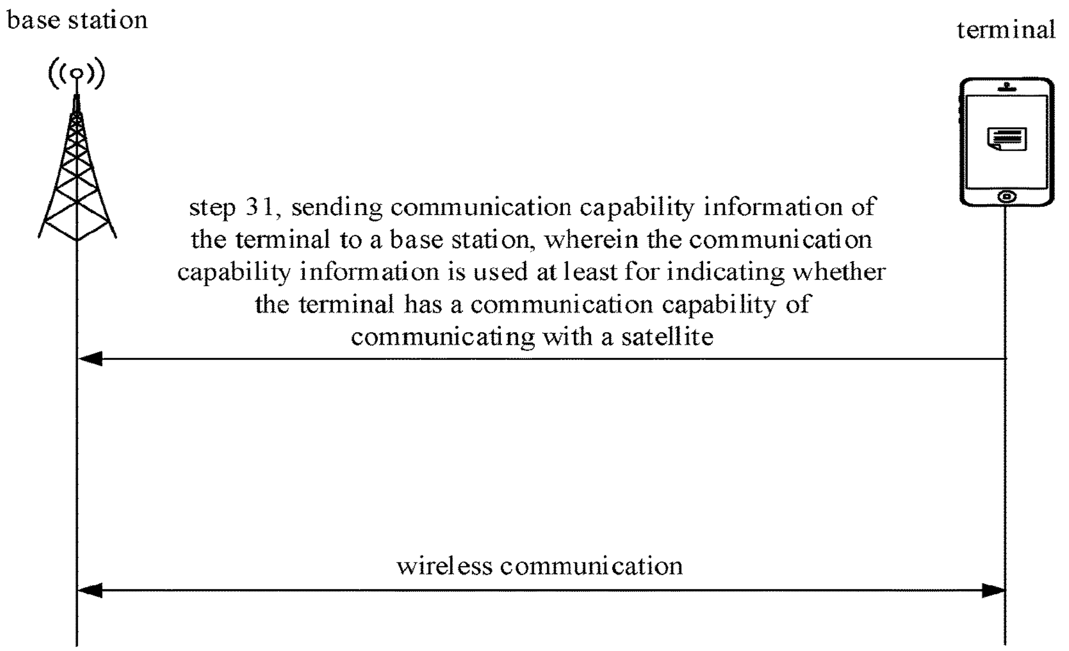
FIG. 3 is a flowchart of a wireless communication method according to an exemplary embodiment.

As shown in FIG. 3, a wireless communication method is provided in this embodiment. The method is applied to the terminal and includes step 31, sending communication capability information of the terminal to a base station, wherein the communication capability information is used at least for indicating whether the terminal has a communication capability of communicating with a satellite.

The terminal may be, but not limited to, a cell phone, a wearable device, a vehicle-mounted terminal, a road side unit (RSU), a smart home terminal, an industrial sensing device, and/or a medical device, etc.

The base station is an interface device for the terminal to access the network. The base station may be a base station of various types, for example, a base station of the third generation mobile communication (3G) network, a base station of the fourth generation mobile communication (4G) network, a base station of the fifth generation mobile communication (5G) network, or other evolved base stations.

In an embodiment, the terminal sends communication capability information of the terminal to the base station in response to the terminal establishing a radio resource control (RRC) connection with the base station. When the base station determines that the terminal supports communication with the satellite based on the communication capability information sent by the terminal, the base station can send the connection information for the terminal to communicate with the satellite to terminal. In this way, the terminal can use the connection information to establish a wireless communication connection with the satellite.

In an embodiment, the terminal sends communication capability information of the terminal to the base station in response to the terminal receiving a trigger command from the user. For example, the terminal works in remote mountainous environment with a small density of base stations and poor signal coverage, resulting in signal environment that is not very good, and abnormal network connectivity often occurs when users use the terminal. At this time, the user can trigger the terminal to send the communication capability information of the terminal to the base station. When the base station determines that the terminal supports communication with the satellite based on the communication capability information sent by the terminal, it can send the connection information for the terminal to communicate with the satellite to the terminal. In this way, the terminal can use the connection information to establish a wireless communication connection with the satellite. Since the communication signal of the satellite is less affected by the mountainous environment, the communication experience of the user can be improved through the wireless communication between the terminal and the satellite.

In an embodiment, the terminal sends the communication capability information of the terminal to the base station in response to the wireless communication signal strength sent by the base station detected by the terminal being less than the first signal threshold. For example, the terminal works in remote mountainous environment with a small density of base stations and poor signal coverage, resulting in signal environment that is not very good. When the strength of the wireless communication signal detected by the terminal is less than the first signal threshold, it triggers the terminal to send the communication capability information of the terminal to the base station. When the base station determines that the terminal supports communication with the satellite based on the communication capability information sent by the terminal, it can send the connection information for the terminal to communicate with the satellite to the terminal. In this way, the terminal can use the connection information to establish a wireless communication connection with the satellite. Since the communication signal of the satellite is less affected by the mountainous environment, the communication experience of the user can be improved through the wireless communication between the terminal and the satellite.

In an embodiment, the first signal threshold is smaller than the second signal threshold, and the second signal threshold is the signal threshold set for switching from communication with the first base station to communication with the second base station due to the weakening of signal strength when the terminal communicates with the first base station. Thus, since the first signal threshold is smaller than the second signal threshold, the switching condition of switching from the first base station to the second base station is satisfied first. When a second base station available for connection exists, the terminal will switch from communicating with the first base station to communicating with the second base station, instead of sending the communication capability information of the terminal to the first base station to acquire connection information and establish a communication connection with the satellite. In this way, the situation of unnecessary switching to establish a communication connection with the satellite when the terminal has a second base station available for switching is reduced.

In an embodiment, the base station determines whether there is a neighboring base station available for connection to the terminal in the vicinity of the base station after receiving the communication capability information sent by the terminal. When it is determined that there are dense neighboring base stations deployed in the vicinity of the base station and the neighboring base station is located close to the terminal, no connection information for establishing a connection between the terminal and the satellite is sent to the terminal. In this case, when the terminal does not receive connection information sent from the base station within a set time period, it will establish a connection with the neighboring base station preferentially. In this way, the terminal will give priority to establishing a communication connection with the neighboring base station. When it is determined that the number of base stations deployed near the base station is less than the set value and the detected wireless communication signal strength is poor, connection information for the terminal establishing a connection with the satellite is sent to the terminal. When the terminal receives the connection information sent from the base station, it uses the connection information to establish a connection with the satellite. In this way, the terminal can establish a communication connection with the satellite when there is no neighboring base station available for the terminal to connect to, ensuring the communication quality of the terminal.

In an embodiment, the terminal sends the communication capability information of the terminal to the base station in response to a switching request sent to the terminal by the base station. For example, when the number of loads connected to the base station exceeds a quantity threshold, in order to reduce the load on the base station, the base station sends to the terminal a switching request requesting the terminal to switch to establish a wireless communication connection with the satellite. After receiving the switch request sent by the base station, the terminal sends the communication capability information of the terminal to the base station. When the base station determines that the terminal supports communication with the satellite based on the received communication capability information, the base station sends connection information for the terminal to communicate with the satellite to the terminal. In this way, the terminal can use the connection information to establish wireless communication with the satellite, relieving the pressure of the number of loads connected to the base station exceeding a quantity threshold.

In an embodiment, after receiving the communication capability information sent by the terminal, the base station does not send the information associated with the communication capability information to the terminal, but sends the connection information of the terminal to the satellite. After receiving the connection information of the terminal sent from the base station, the satellite uses the connection information of the terminal to establish a communication connection with the terminal. Herein, the connection information of the terminal may contain the location information of the terminal.

In an embodiment, the terminal periodically sends communication capability information of the terminal to the base station until a response message associated with the communication capability information fed back from the base station is received. In this way, the situation that the base station cannot receive the communication capability information due to poor wireless communication environment with the base station is reduced, the reliability of the communication capability information transmission is improved.

In an embodiment, the communication capability information sent by the terminal to the base station carries identification information of the terminal. The identification information is used to uniquely identify the terminal. Herein, the identification information of the terminal may be the subscriber identity module (SIM) number of the SIM contained in the terminal.

In an embodiment, the communication capability of the terminal is indicated by the bit information. For example, when the bit identifier is "0", it indicates that the terminal does not support communication with the satellite. When the bit identifier is "1", it indicates that the terminal supports communication with the satellite. Thus, when the bit of the communication capability information of the terminal received by the base station is identified as "0", it is determined that the terminal does not support communication with the satellite. When the bit of the communication capability information of the terminal received by the base station is identified as "1", it is determined that the terminal supports communication with the satellite.

In an embodiment, the coding scheme of the communication capability information indicates whether the terminal supports communication with the satellite. For example, when the communication capability information occupies N bits, it indicates that the terminal supports communication with the satellite. When the communication capability information occupies M bits, it indicates that the terminal does not support communication with the satellite. Thus, when the communication capability information of the terminal received by the base station occupies N bits, it is determined that the terminal supports communication with the satellite. When the communication capability information of the terminal received by the base station occupies M bits, it is determined that the terminal does not support communication with the satellite.

In an embodiment, the communication capability information of the terminal carries the location information of the terminal. After receiving the communication capability information, the base station can determine the location of the terminal based on the communication capability information, and search for the satellite nearest to the terminal based on the location of the terminal. In this way, the base station can send the connection information of the satellite nearest to the terminal to the terminal, and the terminal can establish a communication connection with the satellite nearest to the terminal based on the connection information, so that the signal transmission of communication between the terminal and the satellite will be more stable and the communication quality is ensured.

In an embodiment, the communication capability information of the terminal may also carry the signal strength information of a plurality of satellites detected by the terminal. After receiving the communication capability information, the base station can send the connection information of the satellite with the strongest signal strength detected by the terminal to the terminal, and the terminal can establish a communication connection with the satellite based on the connection information, so that the signal transmission of communication between the terminal and the satellite will be more stable and the communication quality is ensured.

In an embodiment, the communication capability information of the terminal may also carry the signal strength information of a plurality of satellites detected by the terminal. After receiving the communication capability information, the base station can send all the connection information of the plurality of satellites to the terminal, and the terminal can select a satellite nearest to the terminal from the plurality of satellites to establish a communication connection based on the connection information, so that the signal transmission of communication between the terminal and the satellite will be more stable and the communication quality is ensured.

In embodiments of the present disclosure, since the terminal sends the communication capability information indicating whether the terminal supports communication with the satellite to the base station, when the base station confirms that the terminal supports communication with the satellite, it can send the information for the terminal to communicate with the satellite to the terminal, enabling the terminal to establish a communication connection with the satellite using the information. In this way, the terminal obtains connection information of the satellite by sending communication capability information of the terminal to the base station, and can establish the communication connection with the satellite quickly and accurately.

Figure 4:
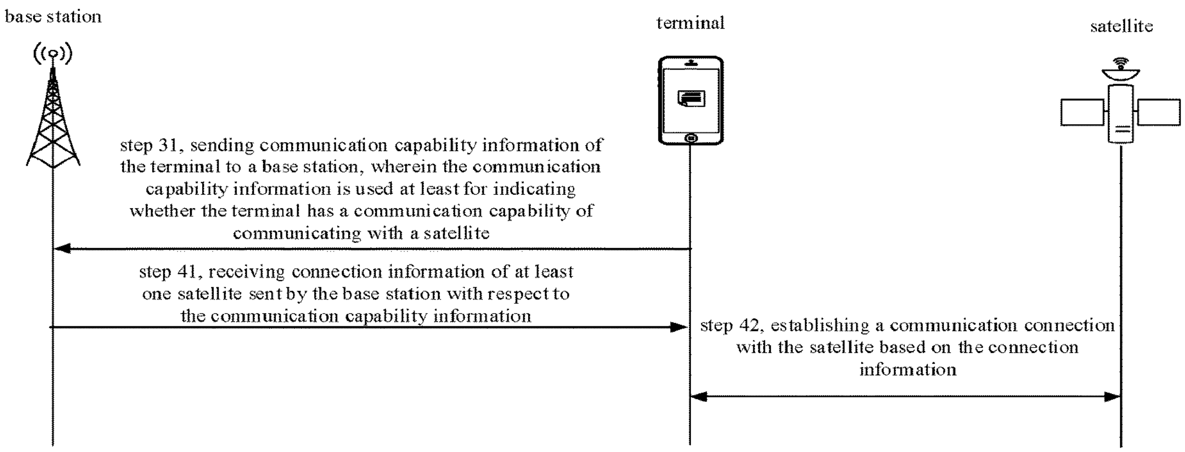
FIG. 4 is a flowchart of a wireless communication method according to an exemplary embodiment.

As shown in FIG. 4, a wireless communication method is provided in this embodiment. The method further includes:

step 41, receiving connection information of at least one satellite sent by the base station with respect to the communication capability information; and step 42, establishing a communication connection with the satellite based on the connection information.

In an embodiment, the connection information of at least one satellite may be connection information of a plurality of satellites that a signal strength of the satellite detected by the base station is greater than a signal threshold. Since the signal strength of the satellite is greater than the signal threshold, the communication quality will be better after the terminal establishes a communication connection with the satellite. It is noted that the signal strength in the present disclosure is the signal strength of a wireless communication signal.

In an embodiment, the connection information of at least one satellite can be the connection information of a plurality of satellites whose distance from the base station or terminal is within a set range as detected by the base station. Since the distance of the satellite from the base station or the terminal is within the set range, the communication quality will be better after the terminal establishes a communication connection with the satellite.

In an embodiment, the connection information of at least one satellite may be the connection information of a plurality of satellites with which a connection is established to the base station.

In an embodiment, the connection information of at least one satellite may be the connection information of a plurality of satellites indicated by the communication capability information. Herein, the communication capability information sent by the terminal to the base station may carry the satellite identifier corresponding to the connection information that needs to be acquired.

In an embodiment, the connection information includes at least one of: an identifier ID (Identity document) of the satellite; trajectory information, for indicating a trajectory of the satellite; flight speed information, for indicating a flight speed of the satellite; and signal coverage information, for indicating signal coverage of the satellite.

Herein, the identifier of a satellite is used to uniquely identify a satellite. The ID of the satellite can be associated with other information of the satellite. For example, if ID of the satellite is "A", the "A" can be associated with the trajectory information, flight speed information and signal coverage information of the satellite, to establish a corresponding relationship. In an embodiment, the mapping relationship as shown in Table 1 can be stored in the base station in the form of a list. The satellite with satellite identifier "A" has the trajectory S1, flight speed K1 and signal coverage C1. The satellite with satellite identifier "B" has trajectory S2, flight speed K2 and signal coverage C2.

TABLE 1

| satellite identifier | trajectory | flight speed | signal coverage |
|---|---|---|---|
| A | S1 | K1 | C1 |
| B | S2 | K2 | C2 |

In an embodiment, the trajectory information is used to indicate the trajectory of the satellite in the current and/or next time period. The terminal may determine whether to establish a communication connection with the satellite based on the trajectory of the satellite. For example, if the satellite trajectory information of the satellite indicates that the satellite will be far away from the location of the terminal in the next time period, the terminal may not establish a communication connection with the satellite. For another example, if the satellite trajectory information of the satellite indicates that the satellite will be close to the location of the terminal in the next time period, the terminal can establish a communication connection with the satellite. In this way, since the satellite will be close to the terminal, there will be good wireless communication quality after the terminal establishes a communication connection with the satellite.

In an embodiment, flight speed information is used to indicate the flight speed of the satellite in the current and/or next time period. The flight speed can be an average speed or an instantaneous speed predicted for the next time period. The terminal may determine whether to establish a communication connection with the satellite based on the flight speed of the satellite. For example, in the next time period, the flight speed information of the satellite indicates that the flight speed of the satellite will become larger, and the terminal may not establish a communication connection with the satellite because the larger flight speed will bring about a large frequency shift and affect the communication quality. For another example, in the next time period, the flight speed information of the satellite indicates that the satellite is less than the speed threshold, and the impact brought by the frequency shift is small, then the terminal can establish a communication connection with the satellite. In this way, the terminal establishes communication with the satellite whose flight speed is within the speed threshold, and the communication quality will be better.

In an embodiment, the signal coverage information is used to indicate the signal coverage of the satellite at the current location. When the terminal determines that the terminal is located within this signal coverage, a communication connection is established with the satellite. When it is determined that the terminal is located outside this signal coverage, a communication connection is not established with the satellite. In another embodiment, when the terminal determines that the terminal is located at an edge position of the signal coverage, no communication connection is established with the satellite. When the terminal is located at a central position of the signal coverage, a communication connection is established with the satellite.

In an embodiment, the communication connection is established with the satellite when the trajectory of the satellite, the flight speed of the satellite and the signal coverage of the satellite are all qualified. For example, when the trajectory of the satellite in the next time period indicates proximity to the terminal, the flight speed of the satellite in the next time period is less than the speed threshold and the signal coverage of the satellite in the next time period covers the terminal, it is determined that a communication connection is established with the satellite.

Figure 5:
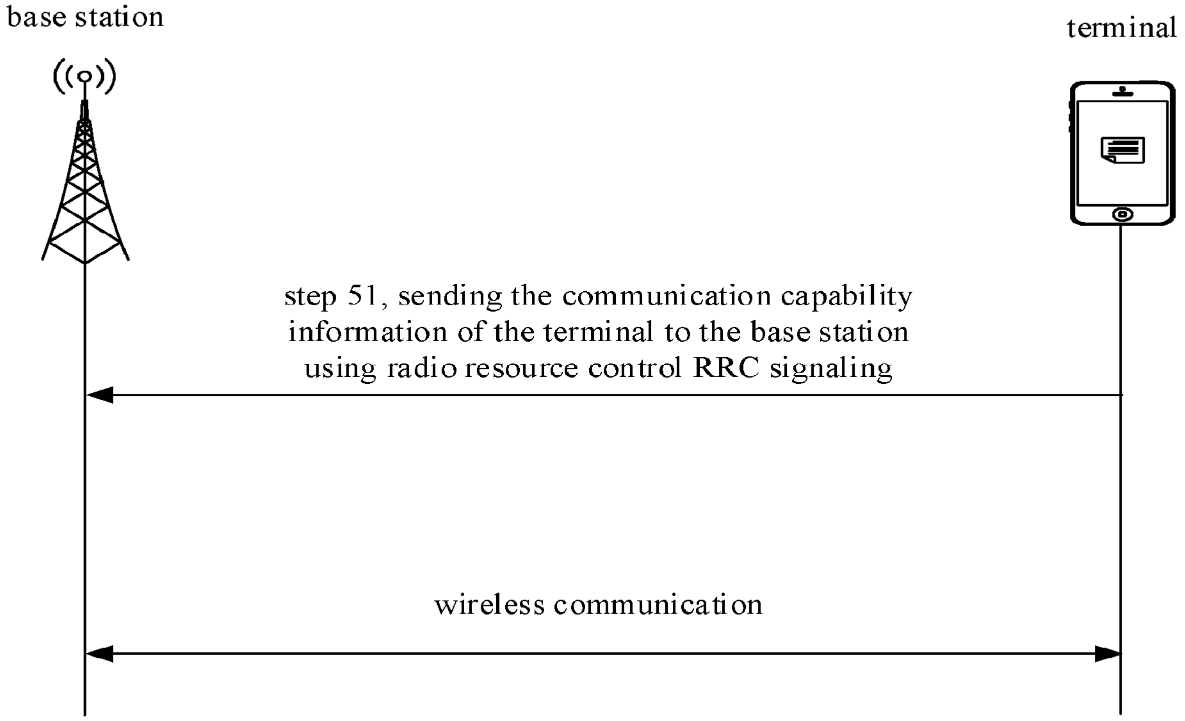
FIG. 5 is a flowchart of a wireless communication method according to an exemplary embodiment.

As shown in FIG. 5, a wireless communication method is provided in this embodiment. The step 31 of sending communication capability information of the terminal to a base station includes: step 51, sending the communication capability information of the terminal to the base station using radio resource control RRC signaling. In an embodiment, the RRC signaling is user equipment new radio capability signaling, UE-NR-Capability signaling, or user equipment evolved Universal Mobile Communication System Terrestrial Radio Access Capability signaling, UE-EUTRAN-Capability signaling.

In an embodiment, the terminal sends the communication capability information of the terminal to the base station using the UE-NR-Capability signaling.

In another embodiment, the terminal sends the communication capability information of the terminal to the base station using the evolved Universal Mobile Communication System Terrestrial Radio Access Capability (UE-EUTRAN-Capability) signaling.

In this way, the existing radio resource control (RRC) signaling can be used to carry the communication capability information of the terminal, which realizes the reuse of radio resource control (RRC) signaling and improves the compatibility of the signaling.

Figure 6:
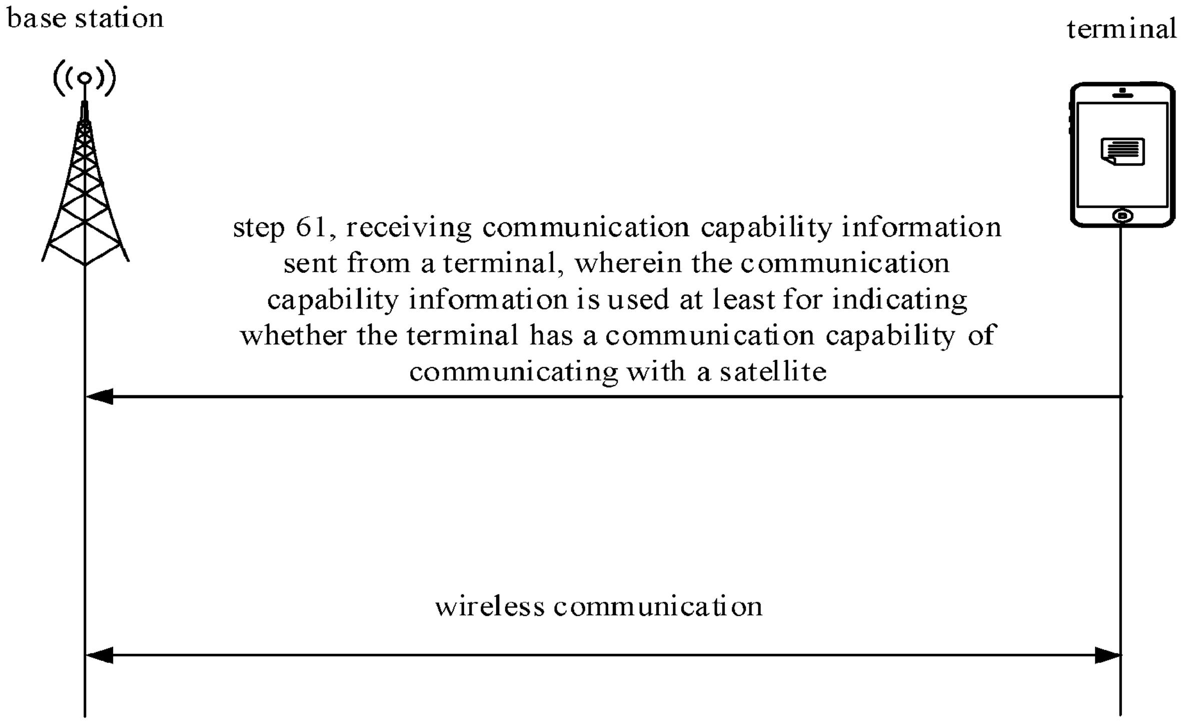
FIG. 6 is a flowchart of a wireless communication method according to an exemplary embodiment.

As shown in FIG. 6, a wireless communication method is provided in this embodiment. The method is applied to a base station and includes: step 61, receiving communication capability information sent by a terminal, wherein the communication capability information is used at least for indicating whether the terminal has a communication capability of communicating with a satellite. The terminal may be, but not limited to, a cell phone, a wearable device, a vehicle-mounted terminal, a road side unit (RSU), a smart home terminal, an industrial sensing device, and/or a medical device, etc.

The base station is an interface device for the terminal to access the network. The base station may be a base station of various types, for example, a base station of the third generation mobile communication (3G) network, a base station of the fourth generation mobile communication (4G) network, a base station of the fifth generation mobile communication (5G) network, or other evolved base stations.

In an embodiment, the terminal sends communication capability information of the terminal to the base station in response to the terminal establishing a radio resource control (RRC) connection with the base station. When the base station determines that the terminal supports communication with the satellite based on the communication capability information sent by the terminal, the base station can send the connection information for the terminal to communicate with the satellite to terminal. In this way, the terminal can use the connection information to establish a wireless communication connection with the satellite.

In an embodiment, the terminal sends communication capability information of the terminal to the base station in response to the terminal receiving a trigger command from the user. For example, the terminal works in remote mountainous environment with a small density of base stations and poor signal coverage, resulting in signal environment that is not very good, and abnormal network connectivity often occurs when users use the terminal. At this time, the user can trigger the terminal to send the communication capability information of the terminal to the base station. When the base station determines that the terminal supports communication with the satellite based on the communication capability information sent by the terminal, it can send the connection information for the terminal to communicate with the satellite to the terminal. In this way, the terminal can use the connection information to establish a wireless communication connection with the satellite. Since the communication signal of the satellite is less affected by the mountainous environment, the communication experience of the user can be improved through the wireless communication between the terminal and the satellite.

In an embodiment, the terminal sends the communication capability information of the terminal to the base station in response to the wireless communication signal strength sent by the base station detected by the terminal being less than the first signal threshold. For example, the terminal works in remote mountainous environment with a small density of base stations and poor signal coverage, resulting in signal environment that is not very good. When the strength of the wireless communication signal detected by the terminal is less than the first signal threshold, it triggers the terminal to send the communication capability information of the terminal to the base station. When the base station determines that the terminal supports communication with the satellite based on the communication capability information sent by the terminal, it can send the connection information for the terminal to communicate with the satellite to the terminal. In this way, the terminal can use the connection information to establish a wireless communication connection with the satellite. Since the communication signal of the satellite is less affected by the mountainous environment, the communication experience of the user can be improved through the wireless communication between the terminal and the satellite.

In an embodiment, the first signal threshold is smaller than the second signal threshold, and the second signal threshold is the signal threshold set for switching from communication with the first base station to communication with the second base station due to the weakening of signal strength when the terminal communicates with the first base station. Thus, since the first signal threshold is smaller than the second signal threshold, the switching condition of switching from the first base station to the second base station is satisfied first. When a second base station available for connection exists, the terminal will switch from communicating with the first base station to communicating with the second base station, instead of sending the communication capability information of the terminal to the first base station to acquire connection information and establish a communication connection with the satellite. In this way, the situation of unnecessary switching to establish a communication connection with the satellite when the terminal has a second base station available for switching is reduced.

In an embodiment, the base station determines whether there is a neighboring base station available for connection to the terminal in the vicinity of the base station after receiving the communication capability information sent by the terminal. When it is determined that there are dense neighboring base stations deployed in the vicinity of the base station and the neighboring base station is located close to the terminal, no connection information for establishing a connection between the terminal and the satellite is sent to the terminal. In this case, when the terminal does not receive connection information sent from the base station within a set time period, it will establish a connection with the neighboring base station preferentially. In this way, the terminal will give priority to establishing a communication connection with the neighboring base station. When it is determined that the number of base stations deployed near the base station is less than the set value and the detected wireless communication signal strength is poor, connection information for the terminal establishing a connection with the satellite is sent to the terminal. When the terminal receives the connection information sent from the base station, it uses the connection information to establish a connection with the satellite. In this way, the terminal can establish a communication connection with the satellite when there is no neighboring base station available for the terminal to connect to, ensuring the communication quality of the terminal.

In an embodiment, the terminal sends the communication capability information of the terminal to the base station in response to a switching request sent to the terminal by the base station. For example, when the number of loads connected to the base station exceeds a quantity threshold, in order to reduce the load on the base station, the base station sends to the terminal a switching request requesting the terminal to switch to establish a wireless communication connection with the satellite. After receiving the switch request sent by the base station, the terminal sends the communication capability information of the terminal to the base station. When the base station determines that the terminal supports communication with the satellite based on the received communication capability information, the base station sends connection information for the terminal to communicate with the satellite to the terminal. In this way, the terminal can use the connection information to establish wireless communication with the satellite, relieving the pressure of the number of loads connected to the base station exceeding a quantity threshold.

In an embodiment, after receiving the communication capability information sent by the terminal, the base station does not send the information associated with the communication capability information to the terminal, but sends the connection information of the terminal to the satellite. After receiving the connection information of the terminal sent from the base station, the satellite uses the connection information of the terminal to establish a communication connection with the terminal. Herein, the connection information of the terminal may contain the location information of the terminal.

In an embodiment, the base station periodically receives communication capability information sent from the terminal until successfully receives a response message associated with the communication capability information fed back from the base station. In this way, the situation that the base station cannot receive the communication capability information due to poor wireless communication environment with the base station is reduced, the reliability of the communication capability information transmission is improved.

In an embodiment, the base station receives the communication capability information sent by the terminal carrying the identification information of the terminal. The identification information is used to uniquely identify the terminal. Herein, the identification information of the terminal may be information of the subscriber identity module (SIM) contained in the terminal.

In an embodiment, the communication capability of the terminal is indicated by the bit information. For example, when the bit identifier is "0", it indicates that the terminal does not support communication with the satellite. When the bit identifier is "1", it indicates that the terminal supports communication with the satellite. Thus, when the bit of the communication capability information of the terminal received by the base station is identified as "0", it is determined that the terminal does not support communication with the satellite. When the bit of the communication capability information of the terminal received by the base station is identified as "1", it is determined that the terminal supports communication with the satellite.

In an embodiment, the base station indicates whether the terminal supports communication with the satellite by the coding scheme of the communication capability information. For example, when the communication capability information occupies N bits, it indicates that the terminal supports communication with the satellite. When the communication capability information occupies M bits, it indicates that the terminal does not support communication with the satellite. Thus, when the communication capability information of the terminal received by the base station occupies N bits, it is determined that the terminal supports communication with the satellite. When the communication capability information of the terminal received by the base station occupies M bits, it is determined that the terminal does not support communication with the satellite.

In an embodiment, the communication capability information of the terminal carries the location information of the terminal. After receiving the communication capability information, the base station can determine the location of the terminal based on the communication capability information, and search for the satellite nearest to the terminal based on the location of the terminal. In this way, the base station can send the connection information of the satellite nearest to the terminal to the terminal, and the terminal can establish a communication connection with the satellite nearest to the terminal based on the connection information, so that the signal transmission of communication between the terminal and the satellite will be more stable and the communication quality is ensured.

In an embodiment, the communication capability information of the terminal may also carry the signal strength information of a plurality of satellites detected by the terminal. After receiving the communication capability information, the base station can send the connection information of the satellite with the strongest signal strength detected by the terminal to the terminal, and the terminal can establish a communication connection with the satellite based on the connection information, so that the signal transmission of communication between the terminal and the satellite will be more stable and the communication quality is ensured.

In an embodiment, the communication capability information of the terminal may also carry the signal strength information of a plurality of satellites detected by the terminal. After receiving the communication capability information, the base station can send the connection information of the plurality of satellites to the terminal, and the terminal can select a satellite nearest to the terminal from the plurality of satellites to establish a communication connection based on the connection information, so that the signal transmission of communication between the terminal and the satellite will be more stable and the communication quality is ensured.

Figure 7:
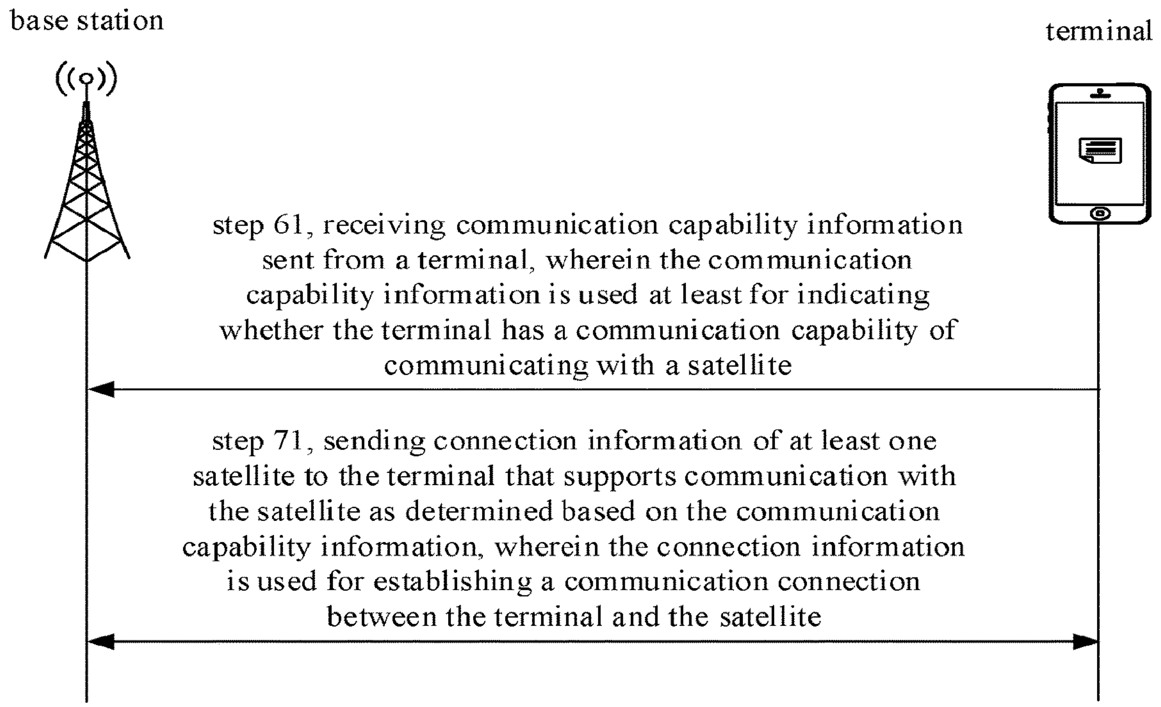
FIG. 7 is a flowchart of a wireless communication method according to an exemplary embodiment.

As shown in FIG. 7, a wireless communication method is provided in this embodiment. The method further includes: step 71, sending connection information of at least one satellite to the terminal that supports communication with the satellite as determined based on the communication capability information, wherein the connection information is used for establishing a communication connection between the terminal and the satellite.

In an embodiment, the communication capability of the terminal is indicated by the bit information. For example, when the bit identifier is "0", it indicates that the terminal does not support communication with the satellite. When the bit identifier is "1", it indicates that the terminal supports communication with the satellite. Thus, when the bit of the communication capability information of the terminal received by the base station is identified as "0", it is determined that the terminal does not support communication with the satellite. When the bit of the communication capability information of the terminal received by the base station is identified as "1", it is determined that the terminal supports communication with the satellite.

In an embodiment, the base station indicates whether the terminal supports communication with the satellite by the coding scheme of the communication capability information. For example, when the communication capability information occupies N bits, it indicates that the terminal supports communication with the satellite. When the communication capability information occupies M bits, it indicates that the terminal does not support communication with the satellite. Thus, when the communication capability information of the terminal received by the base station occupies N bits, it is determined that the terminal supports communication with the satellite. When the communication capability information of the terminal received by the base station occupies M bits, it is determined that the terminal does not support communication with the satellite.

In an embodiment, the connection information of at least one satellite may be connection information of a plurality of satellites that a signal strength of the satellite detected by the base station is greater than a signal threshold. Since the signal strength of the satellite is greater than the signal threshold, the communication quality will be better after the terminal establishes a communication connection with the satellite.

In an embodiment, the connection information of at least one satellite can be the connection information of a plurality of satellites whose distance from the base station or terminal is within a set range as detected by the base station. Since the distance of the satellite from the base station or the terminal is within the set range, the communication quality will be better after the terminal establishes a communication connection with the satellite.

In an embodiment, the connection information of at least one satellite may be the connection information of a plurality of satellites with which a connection is established to the base station.

In an embodiment, the connection information of at least one satellite may be the connection information of a plurality of satellites indicated by the communication capability information. Herein, the communication capability information sent by the terminal to the base station may carry the satellite identifier corresponding to the connection information that needs to be acquired.

In an embodiment, the connection information includes at least one of: an identifier ID (Identity document) of the satellite; trajectory information, for indicating a trajectory of the satellite; flight speed information, for indicating a flight speed of the satellite; and signal coverage information, for indicating signal coverage of the satellite.

Herein, the identifier of a satellite is used to uniquely identify a satellite. The ID of the satellite can be associated with other information of the satellite. For example, if ID of the satellite is "A", the "A" can be associated with the trajectory information, flight speed information and signal coverage information of the satellite, to establish a one-to-one corresponding relationship. In an embodiment, the mapping relationship as shown in Table 1 can be stored in the base station in the form of a list. The satellite with satellite identifier "A" has the trajectory S1, flight speed K1 and signal coverage C1. The satellite with satellite identifier "B" has trajectory S2, flight speed K2 and signal coverage C2.

In an embodiment, the trajectory information is used to indicate the trajectory of the satellite in the current and/or next time period. The terminal may determine whether to establish a communication connection with the satellite based on the trajectory of the satellite. For example, if the satellite trajectory information of the satellite indicates that the satellite will be far away from the location of the terminal in the next time period, the terminal may not establish a communication connection with the satellite. For another example, if the satellite trajectory information of the satellite indicates that the satellite will be close to the location of the terminal in the next time period, the terminal can establish a communication connection with the satellite. In this way, since the satellite will be close to the terminal, there will be good wireless communication quality after the terminal establishes a communication connection with the satellite.

In an embodiment, flight speed information is used to indicate the flight speed of the satellite in the current and/or next time period. The flight speed can be an average speed or an instantaneous speed predicted for the next time period. The terminal may determine whether to establish a communication connection with the satellite based on the flight speed of the satellite. For example, in the next time period, the flight speed information of the satellite indicates that the flight speed of the satellite will become larger, and the terminal may not establish a communication connection with the satellite because the larger flight speed will bring about a large frequency shift and affect the communication quality. For another example, in the next time period, the flight speed information of the satellite indicates that the satellite is less than the speed threshold, and the impact brought by the frequency shift is small, then the terminal can establish a communication connection with the satellite. In this way, the terminal establishes communication with the satellite whose flight speed is within the speed threshold, and the communication quality will be better.

In an embodiment, the signal coverage information is used to indicate the signal coverage of the satellite at the current location. When the terminal determines that the terminal is located within this signal coverage, a communication connection is established with the satellite. When it is determined that the terminal is located outside this signal coverage, a communication connection is not established with the satellite. In another embodiment, when the terminal determines that the terminal is located at an edge position of the signal coverage, no communication connection is established with the satellite. When the terminal is located at a central position of the signal coverage, a communication connection is established with the satellite.

In an embodiment, the communication connection is established with the satellite when the trajectory of the satellite, the flight speed of the satellite and the signal coverage of the satellite are all qualified. For example, when the trajectory of the satellite in the next time period indicates proximity to the terminal, the flight speed of the satellite in the next time period is less than the speed threshold and the signal coverage of the satellite in the next time period covers the terminal, it is determined that a communication connection is established with the satellite.

Figure 8:
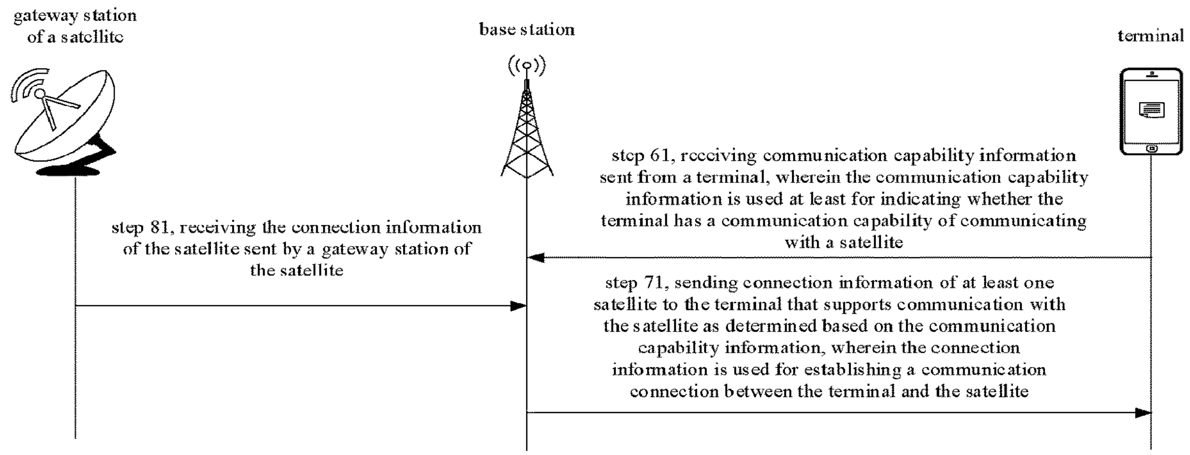
FIG. 8 is a flowchart of a wireless communication method according to an exemplary embodiment.

As shown in FIG. 8, a wireless communication method is provided in this embodiment. The method further includes: step 81, receiving the connection information of the satellite sent by a gateway station of the satellite.

In an embodiment, in response to the gateway station of the satellite establishing a connection with the base station, the connection information of the satellite sent by the gateway station of the satellite is received.

In an embodiment, the base station receives the connection information of the satellite sent by the gateway station of the satellite based on the request of the base station. For example, upon receiving the communication capability information sent from the terminal, the base station sends a request message for requesting the gateway station to send the connection information of the satellite to the gateway station of the satellite. Upon receiving the request message, the gateway station sends the connection information to the base station.

Figure 9:
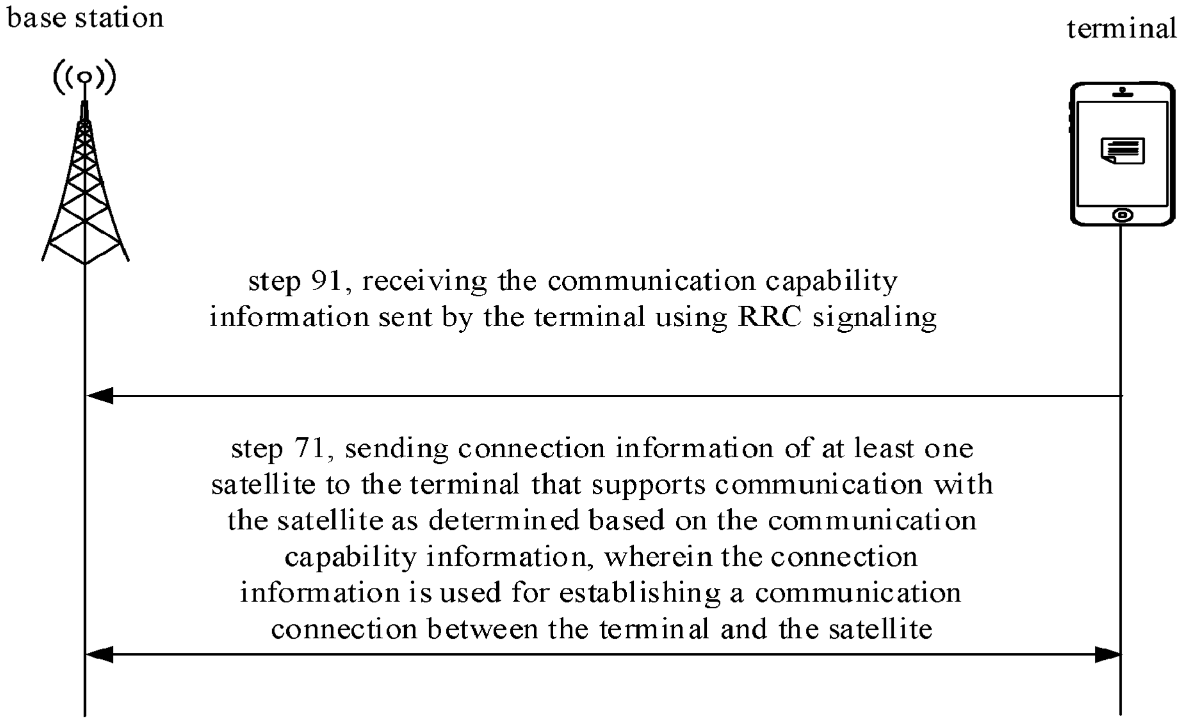
FIG. 9 is a flowchart of a wireless communication method according to an exemplary embodiment.

As shown in FIG. 9, a wireless communication method is provided in this embodiment. The step 61 of receiving communication capability information sent by a terminal includes: step 91, receiving the communication capability information sent by the terminal using RRC signaling. In an embodiment, the RRC signaling is user equipment new radio capability signaling, UE-NR-Capability signaling, or user equipment evolved Universal Mobile Communication System Terrestrial Radio Access Capability signaling, UE-EUTRAN-Capability signaling.

In an embodiment, the terminal sends the communication capability information of the terminal to the base station using the UE-NR-Capability signaling. In another embodiment, the terminal sends the communication capability information of the terminal to the base station using the evolved Universal Mobile Communication System Terrestrial Radio Access Capability (UE-EUTRAN-Capability) signaling.

In this way, the existing radio resource control (RRC) signaling can be used to carry the communication capability information of the terminal, which realizes the reuse of radio resource control (RRC) signaling and improves the compatibility of the signaling.

Figure 10:
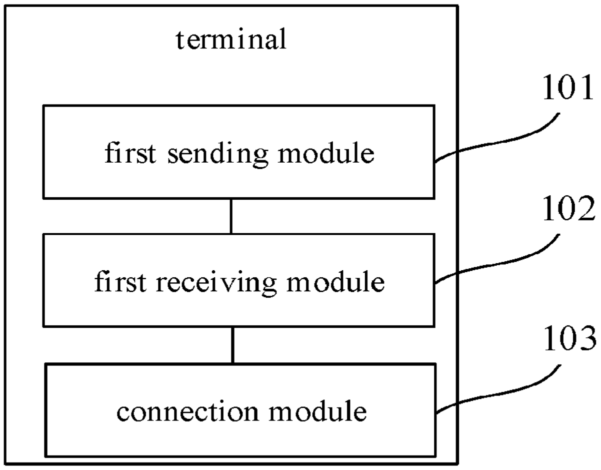
FIG. 10 is a schematic diagram of a terminal according to an exemplary embodiment.

As shown in FIG. 10, a terminal is provided in this embodiment. The terminal includes a first sending module 101. The first sending module 110 is configured to send communication capability information of the terminal to a base station, wherein the communication capability information is used at least for indicating whether the terminal has a communication capability of communicating with a satellite.

In an embodiment, the terminal further includes a first receiving module 102 and a connection module 103. The first receiving module 102 is configured to receive connection information of at least one satellite sent by the base station with respect to the communication capability information. The connection module 103 is configured to establish a communication connection with the satellite based on the connection information.

In an embodiment, the first sending module 101 is further configured to send the communication capability information of the terminal to the base station using radio resource control RRC signaling.

Figure 11:
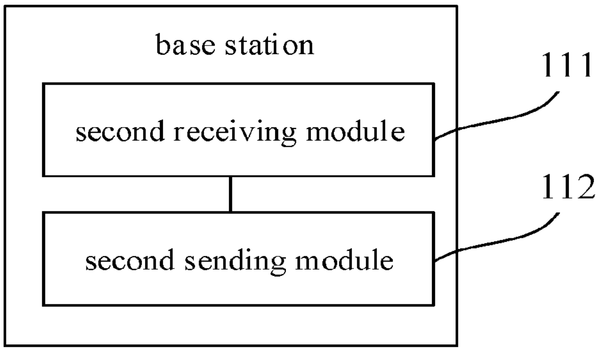
FIG. 11 is a schematic diagram of a base station according to an exemplary embodiment.

As shown in FIG. 11, a base station is provided in this embodiment. The base station includes a second receiving module 111. The second receiving module 111 is configured to receive communication capability information sent by a terminal, wherein the communication capability information is used at least for indicating whether the terminal has a communication capability of communicating with a satellite.

In an embodiment, the base station includes a second sending module 112. The second sending module 112 is configured to send connection information of at least one satellite to the terminal that supports communication with the satellite as determined based on the communication capability information, wherein the connection information is used for establishing a communication connection between the terminal and the satellite.

In an embodiment, the second receiving module 111 is further configured to receive the connection information of the satellite sent by a gateway station of the satellite.

In an embodiment, the second receiving module 111 is further configured to receive the communication capability information sent by the terminal using RRC signaling.

With respect to the apparatus in the above embodiments, the specific manner in which the individual modules perform their operations has been described in detail in the embodiments relating to the method and will not be described in detail herein.

Embodiments of the present disclosure provide a communication device, including a processor and a memory for storing instructions executable by the processor. The processor can be configured to implement a method applied to any embodiment of the present disclosure when running the executable instructions.

The processor may include various types of storage media. The storage media are non-transitory computer storage media that are capable of continuing to keep memory of information stored thereon after the communication device is powered down.

The processor may be connected to the memory via a bus or the like for reading executable programs stored on the memory.

Embodiments of the present disclosure also provide a non-transitory computer storage medium. The computer storage medium stores a computer executable program, and the executable program implements the method of any embodiment of the present disclosure when executed by the processor.

With respect to the apparatus of the above embodiments, the specific manner in which the individual modules perform the operations has been described in detail in the embodiments relating to the method, and will not be described in detail herein.

Figure 12:
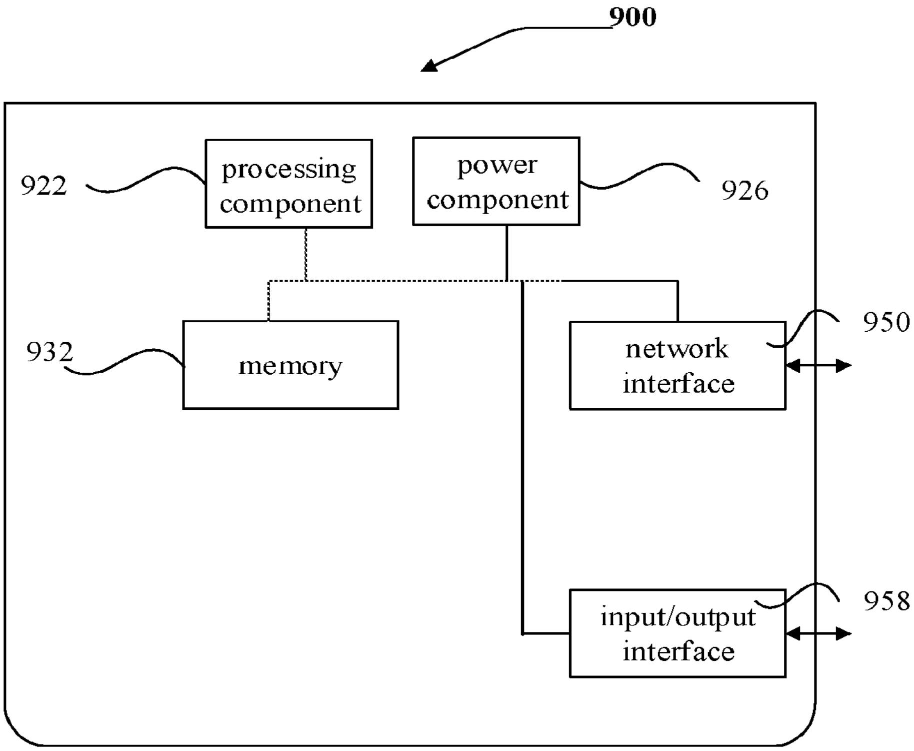
FIG. 12 is a block diagram of a base station according to an exemplary embodiment.

As shown in FIG. 12, an embodiment of the present disclosure illustrates a structure of a base station. For example, the base station 900 may be provided as a network side device. Referring to FIG. 12, the base station 900 includes a processing component 922 which further includes one or more processors, and a memory resource represented by memory 932 for storing instructions, such as applications, that may be executed by the processing component 922. The application programs stored in the memory 932 may include one or more modules each corresponding to a set of instructions. In addition, the processing component 922 is configured to execute the instructions to perform any of the methods applied to the base station described above.

The base station 900 may also include a power component 926 configured to perform power management of the base station 900, a wired or wireless network interface 950 configured to connect the base station 900 to a network, and an input/output (I/O) interface 958. The base station 900 may operate an operating system stored in the memory 932, such as Windows Server™ Mac OS X™, Unix™, Linux™, FreeBSD™, or the like.

Other embodiments of the present disclosure will readily occur to those skilled in the art upon consideration of the specification and practice of the disclosure disclosed herein. The present disclosure is intended to cover any variations, uses, or adaptations of the present disclosure that follow the general principles of the present disclosure and include common knowledge or techniques in the technical field not disclosed by the present disclosure. The specification and embodiments are regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A wireless communication method, applied to a terminal and comprising:

sending communication capability information of the terminal to a base station, wherein the communication capability information is used at least for indicating whether the terminal has a communication capability of communicating with a satellite;

wherein, in response to determining that dense neighboring base stations are deployed in vicinity of the base station and the neighboring base stations are located close to the terminal, no connection information used for establishing a connection between the terminal and the satellite is sent to the terminal, and the terminal establishes a connection with the neighboring base station in response to not receiving the connection information within a set time period; and in response to determining that the number of base stations deployed near the base station is less than a set value and a detected wireless communication signal strength is poor, the connection information used for establishing a connection between the terminal and the satellite is sent to the terminal, and the terminal establishes a connection with the satellite using the connection information, wherein the method further comprises:

receiving connection information of at least one satellite sent by the base station with respect to the communication capability information;

establishing a communication connection with the satellite based on the connection information, wherein the connection information comprises at least one of:

an identifier ID of the satellite;

trajectory information, for indicating a trajectory of the satellite;

flight speed information, for indicating a flight speed of the satellite; or signal coverage information, for indicating signal coverage of the satellite.

2. The method according to claim 1, wherein said sending communication capability information of the terminal to a base station comprises:

sending the communication capability information of the terminal to the base station using radio resource control RRC signaling.

3. The method according to claim 2, wherein the RRC signaling is user equipment new radio capability signaling, UE-NR-Capability signaling, or user equipment evolved Universal Mobile Communication System Terrestrial Radio Access Capability signaling, UE-EUTRAN-Capability signaling.

4. A terminal, comprising:

a processor; and a memory, for storing instructions executable by the processor, wherein the processor is configured to:

send communication capability information of the terminal to a base station, wherein the communication capability information is used at least for indicating whether the terminal has a communication capability of communicating with a satellite;

wherein, in response to determining that dense neighboring base stations are deployed in vicinity of the base station and the neighboring base stations are located close to the terminal, no connection information used for establishing a connection between the terminal and the satellite is sent to the terminal, and the terminal establishes a connection with the neighboring base station in response to not receiving the connection information within a set time period; and in response to determining that the number of base stations deployed near the base station is less than a set value and a detected wireless communication signal strength is poor, the connection information used for establishing a connection between the terminal and the satellite is sent to the terminal, and the terminal establishes a connection with the satellite using the connection information, wherein the processor is configured to:

receive connection information of at least one satellite sent by the base station with respect to the communication capability information;

establish a communication connection with the satellite based on the connection information, wherein the connection information comprises at least one of:

an identifier ID of the satellite;

trajectory information, for indicating a trajectory of the satellite;

flight speed information, for indicating a flight speed of the satellite; or signal coverage information, for indicating signal coverage of the satellite.

5. The terminal according to claim 4, wherein the processor is further configured to send the communication capability information of the terminal to the base station using radio resource control RRC signaling.

6. A non-transitory computer storage medium, wherein the computer storage medium stores a computer executable program, the executable program implements the method according to claim 1 when executed by a processor.

* * * * *